United States Patent [19]
Maier

[11] Patent Number: 6,044,864
[45] Date of Patent: Apr. 4, 2000

[54] FUEL NECK VALVE CONTROL

[75] Inventor: Bernhard Maier, Bad Gleichenberg, Austria

[73] Assignee: Tesma Motoren- & Getriebetechnik Ges.m.b.H., Preding-Krottendorf, Austria

[21] Appl. No.: 09/168,573

[22] Filed: Oct. 8, 1998

[30] Foreign Application Priority Data

Oct. 15, 1997 [AT] Austria ................................. 1748/97

[51] Int. Cl.[7] ................................................ F16K 24/00
[52] U.S. Cl. ..................... 137/588; 251/149.2; 251/228
[58] Field of Search ............................. 251/149.2, 149.7, 251/228; 137/587, 592, 588; 141/59; 220/86.1, 86.2

[56] References Cited

U.S. PATENT DOCUMENTS

| | | | |
|---|---|---|---|
| 639,582 | 12/1899 | Kabisch | 251/149.2 |
| 1,497,054 | 6/1924 | Allabach | 251/149.2 |
| 3,580,414 | 5/1971 | Ginsburgh | 251/149.2 |
| 4,719,949 | 1/1988 | Mears | 137/587 |
| 4,765,504 | 8/1988 | Sherwood | 141/59 |
| 4,881,655 | 11/1989 | Jansky et al. | 251/149.2 |
| 4,955,950 | 9/1990 | Seiichi et al. | 141/59 |
| 5,027,868 | 7/1991 | Morris et al. | 137/587 |
| 5,186,220 | 2/1993 | Scharrer | 141/59 |

*Primary Examiner*—Kevin Shaver
*Assistant Examiner*—David A Bonderer
*Attorney, Agent, or Firm*—Karl Hormann

[57] ABSTRACT

An apparatus for slidably moving a valve control member adjacent a fuel neck of a fuel tank without generating transverse forces. The apparatus provides a slide engaging the valve control member and a toggle lever one arm of which slidably engages a pivotal lid in the fuel neck and the other arm of which is mounted for pivoting about an axis parallel to the pivot axis of the lid. The junction between the arms of the toggle lever engages the slide and converts the pivotal movement of the lid into linear movement of the slide and the valve control member.

6 Claims, 3 Drawing Sheets

FUEL NECK VALVE CONTROL

BACKGROUND OF THE INVENTION

1. Field of the Invention

The invention, in general, relates to a fuel neck valve control and, more particularly, to an apparatus for controlling the sliding movement of a valve control member at the upper end of a filling neck of a fuel tank. During refuelling operations, such valves are actuated by the pivoting movement of a closure lid provided in the fuel neck in response to the insertion of a fuel nozzle, to control the flow of fuel vapors and to prevent accidental overflows of fuel.

2. Background of the Invention

For converting the pivotal movement of the closure lid provided in fuel necks for the purpose of restricting them to the insertion of the typically smaller diameter fuel nozzles used for unleaded fuel, into the sliding movement necessary to actuate the control member of such a valve, toothed rack drives have hitherto been known. Under heavy use and rough handling, such drives are, however, subject to jamming. Moreover, they are relatively bulky or voluminous and prove problematic in the restricted confines of a fuel neck. However, the valve control member cannot be directly actuated by the pivoting lid as any sliding movement of the control member over the surface of the lid would result in transverse forces which, in turn, may lead to jamming or blocking of the valve.

OBJECTS OF THE INVENTION

It is an object of the invention to provide an apparatus which is both compact and free from malfunctioning.

Another object is to provide an apparatus of the kind here under consideration which does not lead to transverse forces in the sliding movement of a control member of a control valve.

Furthermore, it is an object of the invention to provide an apparatus which transmits the pivoting movement of a fuel neck lid into sliding movement of a valve control member without subjecting it to transverse forces.

BRIEF SUMMARY OF THE INVENTION

In accordance with these and other objects, the invention provides for a slide linearly movable laterally of the side wall of a fuel neck and normal to the pivot axis of a fuel neck lid and a toggle lever one arm of which is mounted adjacent to the sidewall of the fuel neck for pivoting about an axis parallel to the pivot axis of the lid with its other arm engaging the lid and it angular section drivingly engaging the slide.

Not only is the apparatus in accordance with the invention of simple and compact construction, but it is also capable of converting the pivoting movement of the fuel neck lid into a linear movement of the valve control member free of any lateral forces.

In a preferred embodiment of the invention the slide is of substantially U-shaped configuration. Its two legs are slidably retained in the side wall and its center section forms an abutment engaging the control member of the valve. The toggle lever is movably received between the legs. The resultant structure is very compact.

Preferably, for reducing sliding friction, the lever is provided with lateral pins received in cam groves in the inner surfaces of the arms.

In accordance with a particularly advantageous embodiment of the invention, the guidance of the slide in the sidewall is provided with a spring lock to prevent loss of the slide before assembling the apparatus in the fuel neck in engagement with the control valve and which is thereafter released.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of preferred embodiment when read with reference to the appended drawings, in which:

FIG. 1 is a sectional view of the upper end of a fuel neck provided with the apparatus in accordance with the invention;

FIG. 2 bottom view of the apparatus of FIG. 1 including a schematically shown laterally mounted valve;

DETAILED DESCRIPTION OF THE PREFERRED EMBODIMENT

Figure 1:
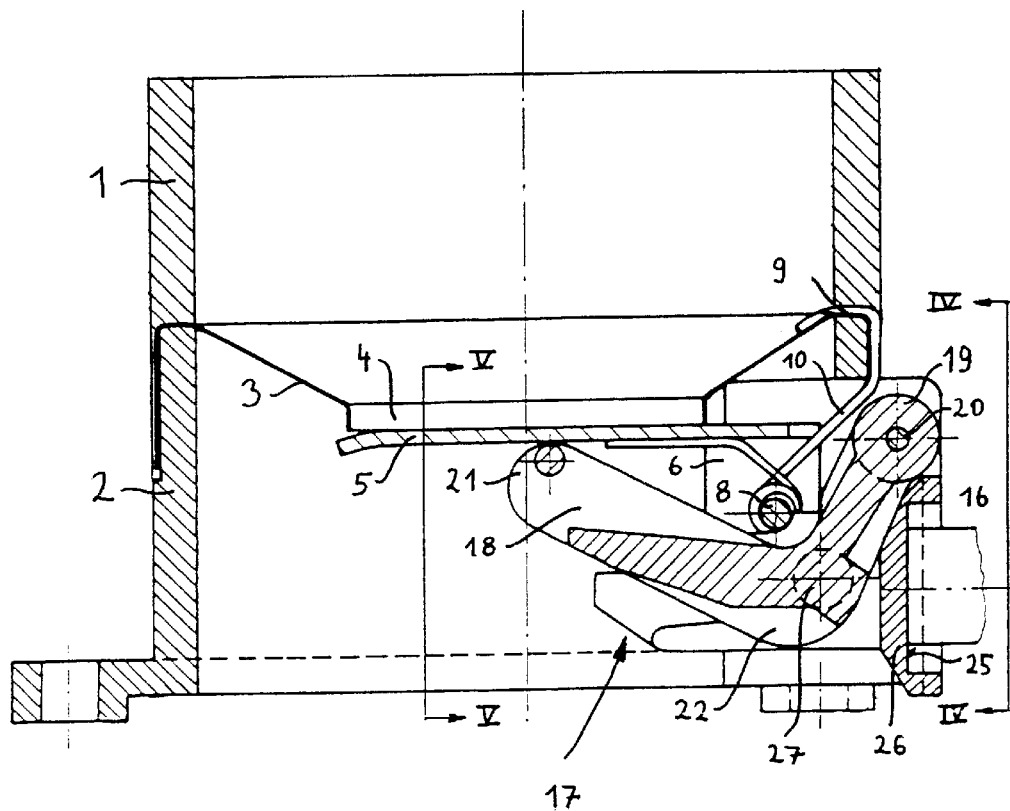

In FIG. 1, there is shown the upper end of a fuel neck 1 the lower end (not shown) of which enters into a fuel tank (also not shown). The upper opening of the fuel neck 1 may be closed by a conventional cap or stopper, for instance, by means of screw or bayonet threads (not shown).

An insert 2 for mounting a funnel-shaped reducing ring 3 and for supporting a lid 5 of a center opening 4 in the ring 3 is mounted in the fuel neck 1. The insert 2 as well as the reducing ring 3 may be of unitary construction with the fuel neck 1. The diameter of the opening 4 in the reducing ring 3 is such that it can only accommodate the smaller diameter fuel nozzles used for unleaded fuel. Therefore, the lid 5 may be laterally pivoted in a downward direction by insertion of an unleaded fuel nozzle.

The lid 5 is pivotally mounted by a pair of ears 6 received on a shaft 8 journalled in the sidewall 7 of the fuel neck 1. A spring 10 mounted on the shaft 8 and engaging, by one of its arms, the lower surface of the lid 5 and, by the other of its arms, a mounting recess 9 in the sidewall 7, biases the lid 5 against the rim of the opening 4.

Figure 2:
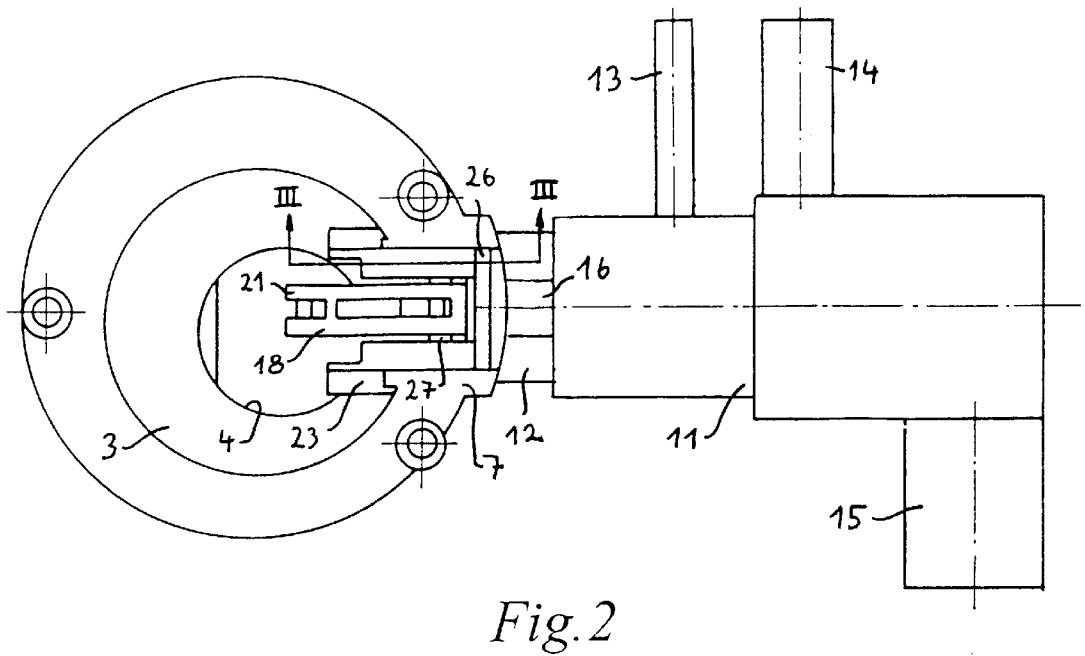

A valve arrangement 11 (FIG. 2) is mounted, as by a flange, laterally of the fuel neck 1 by means not shown in detail. The valve arrangement is part of a so-called on board refuelling vapor recovery system (hereafter ORVR system) for controlling the flow of fuel vapors and preventing fuel spills or overflows during a refuelling operation. In an ORVR system, any fuel vapors which may occur during a refuelling operation are trapped at the vehicle, i.e. "on board" in a trap provided with activated charcoal. When the vehicle is driven, combustion gases will flush any fuel residue out of the charcoal and feed it into the combustion chambers.

The valve arrangement 11 may for instance be a 4/2 way valve having four connections 12–15. Connection 15 leads to the activated charcoal filter; the large diameter connection 12 leads directly into the fuel neck 1, vents the fuel tank to the activated charcoal during refuelling, and is closed when the vehicle is driven. The small diameter connection 13 also leads to the fuel neck but is only open while the vehicle is driven to vent the fuel neck and to balance pressure therein. The connection 14 is connected to a vapor trap at the upper portion of the fuel tank. It is closed during refuelling and open while the vehicle is driven and serves to prevent overflows, as is well known to the skilled artisan.

The valve arrangement 11 may be switched by a slidingly actuable control element 16 (valve spindle, valve plunger) and a mechanism, generally shown at 17, for converting the pivotal movement of the lid 5 into the sliding movement of the control element 16, between a refuelling state (lid 5 open) on the one hand and a driving state (lid 5 closed) on the other hand. In view of the restricted space in the fuel neck 1, the mechanism 17 has to be compact, and it must prevent the introduction of any transverse forces into the control element 16, i.e. forces acting in directions normal to the sliding direction of the control element 16.

To this end, the mechanism 17 is provided with a toggle lever 18 which at one of its ends 19 is pivotally mounted at 20 within the sidewall 7, radially outside of the shaft 8. At its other end 21, the toggle lever slidably engages the lower surface of the lid 5. Its angled section 22 surrounds the shaft 8 and cooperated with a slide 23 mounted in the sidewall 7 or, more precisely groove and feather guides 24, for sliding movement normal to the pivot axis of the lid 5. At its outer end, the slide 23 is provided with an abutment surface 25 for engaging an end section of the control element 16 of the valve arrangement 11. Thus, movement of the slide 23 actuates the valve.

In top elevation the slide 23 is substantially U-shaped (FIG. 2), its to legs 23' being supported in the sidewall 7 by the groove and feather arrangement 24 and its center portion 26 is provides the abutment surface 25. Thus, the toggle lever 18 may move within the center of the slide 23.

Figure 3:
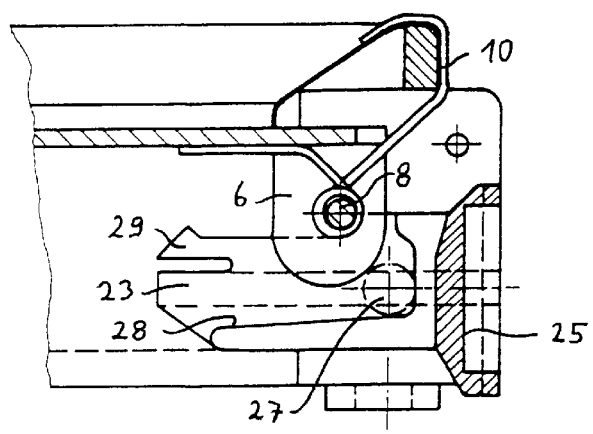
FIG. 3 is a partial sectional view along line III—III in FIG. 2.
Figure 4:
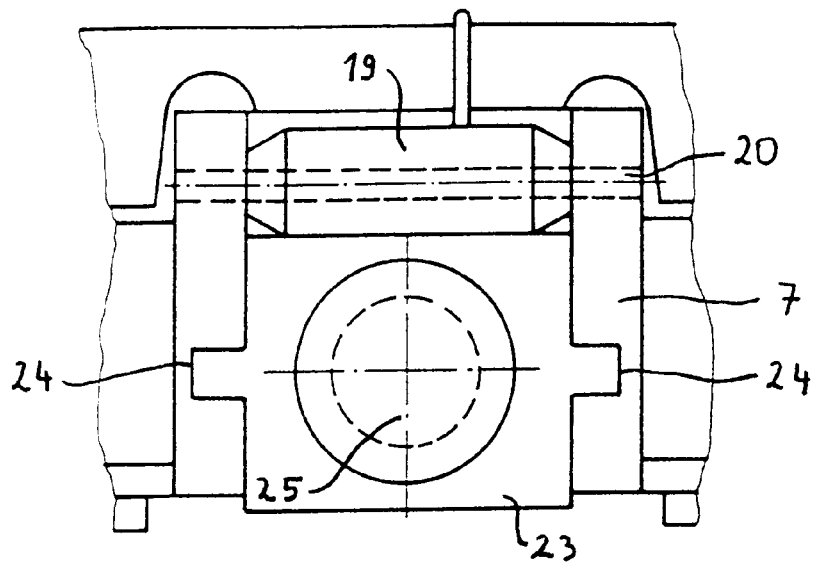
FIG. 4 is a sectional side view along line IV—IV in FIG. 1.
Figure 5:
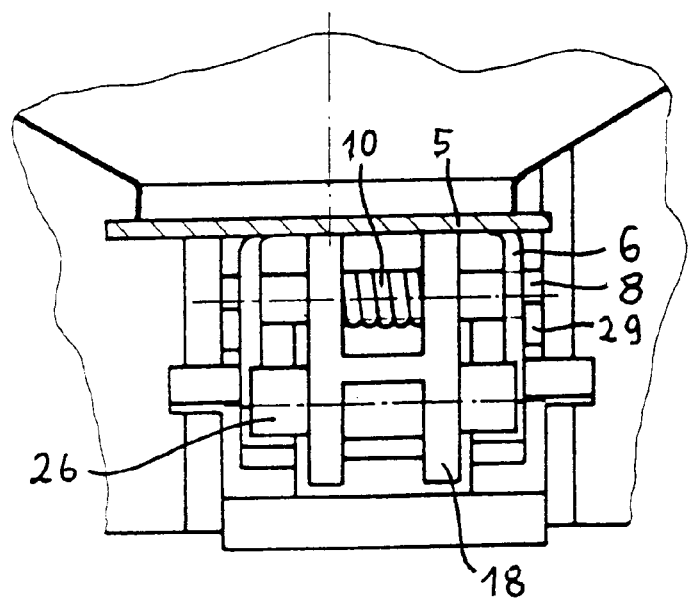
FIG. 5 is a partial sectional view along line V—V in FIG. 1.

The angled section 22 of the toggle lever 18 may act directly upon the center portion 26 of the slide 23. In the embodiment shown, however, the angle section 22 is provided with laterally protruding pins 27 which are received in cam grooves 28 (FIG. 3) at the inner surfaces of the legs of the slide 23.

The two legs 23' of the slide 23 are provided with resilient locking hooks 29 which when the apparatus is first mounted, i.e when the slide 23 is inserted into the sidewall by the feather and groove arrangement 24 for the first time, which will resiliently move over the shaft 8 of the lid 5 at the beginning of the insertion and thus prevent the slide 23 from becoming lost as long as the valve arrangement 11 has not been assemble adjacent to the mechanism 17.

It is not necessary that axis of movement of the slide 23 and of the control member 16 extends normal to the axis of the fuel neck 1. It may also be disposed obliquely relative to the axis of the fuel neck, provided it extends normal to the pivot axis 8 of the lid 5.

What is claimed is:

1. An apparatus for actuating without transverse forces a valve control member mounted for slidable movement along an axis intersecting a fuel neck of a fuel tank, comprising:

a lid mounted in the fuel neck for pivotal movement about an axis extending at a predetermined spacing from the wall of the fuel neck substantially normal to the axis of the fuel neck between first and second positions in response to the insertion of an elongate member;

means for converting the pivoting movement of the lid into sliding movement of the valve control member, comprising a first arm mounted intermediate the pivot axis of the lid and the wall of the fuel neck for pivotal movement about an axis extending substantially parallel to the pivot axis of the lid and a second arm slidably abutting the lid and rigidly joined to the first arm by a junction of predetermined angularity;

a slide member mounted for movement substantially coaxially with the valve control member between first and second positions and having a first section abutting the valve control member and a second section abutting the means for converting adjacent to the junction.

2. The apparatus of claim 1, wherein the slide member comprises first and second legs joined by an intermediate member, the legs being slidably mounted in the wall of the fuel neck with the intermediate member abutting the valve control member.

3. The apparatus of claim 2, wherein the junction of the converting means is connected to the slide member intermediate the first and second legs.

4. The apparatus of claim 3, wherein each leg is provided with cam surfaces and the junction is provided with pins extending laterally therefrom into engagement with the cam surfaces.

5. The apparatus of claim 2, wherein the slide is mounted in the wall of the fuel neck by a groove and feather connection.

6. The apparatus of claim 5, wherein each arm is provided with a protrusion resiliently deformable by engaging the pivot axis of the lid during initial slidable assembly of the slide in the fuel neck.

\* \* \* \* \*